US010117382B2

United States Patent
Li et al.

(10) Patent No.: US 10,117,382 B2
(45) Date of Patent: Nov. 6, 2018

(54) MULTI-FUNCTIONAL GARDEN IMPLEMENT

(71) Applicants: Weijun Li, Taizhou (CN); Genfa Mao, Taizhou (CN); Shijun Zhu, Taizhou (CN)

(72) Inventors: Weijun Li, Taizhou (CN); Genfa Mao, Taizhou (CN); Shijun Zhu, Taizhou (CN)

(73) Assignee: Wenling Jennfeng Industry Inc., Taizhou (CN)

( * ) Notice: Subject to any disclaimer, the term of this patent is extended or adjusted under 35 U.S.C. 154(b) by 234 days.

(21) Appl. No.: 15/168,111

(22) Filed: May 30, 2016

(65) Prior Publication Data

US 2017/0223894 A1   Aug. 10, 2017

(30) Foreign Application Priority Data

Feb. 4, 2016  (CN) .................... 2016 2 0114499 U (51) Int. Cl.
*A01D 42/04* (2006.01)
*A01B 33/00* (2006.01)
(Continued)

(52) U.S. Cl.
CPC .............. *A01D 42/04* (2013.01); *A01B 33/00* (2013.01); *A01B 33/028* (2013.01); *A01B 51/00* (2013.01);
(Continued)

(58) Field of Classification Search
CPC ......... A01B 33/08; A01B 33/00; A01B 33/14; A01B 33/144; A01D 42/00; A01D 42/04; A01D 34/10; A01D 34/404; A01D 34/68; A01D 34/84; A01D 34/412–34/42; A01D 34/90; B25F 5/00; A01G 3/062; F16B 1/04; F16B 7/0426; F16B 7/1418; F16B 7/1454; F16B 7/14; F16B 21/125; F16D 1/108; F16D 1/112; F16C 1/00
See application file for complete search history.

(56) References Cited

U.S. PATENT DOCUMENTS 844,130   A  *  2/1907  Howard ................ B23B 31/113
                                                        15/145
2,613,582 A     10/1952 Harshberger
(Continued)

FOREIGN PATENT DOCUMENTS

CN         201509430        6/2010

*Primary Examiner* — Jessica H Lutz
(74) *Attorney, Agent, or Firm* — Minder Law Group; Willy H. Wong (57) ABSTRACT

A multi-functional garden implement comprises an underframe, and a power motor is secured to the underframe. The multi-functional garden implement also comprises an adapting tube, inside which a transmitting shaft is rotatably connected. One end of the transmitting shaft connects to a working head. A locking sleeve is secured to the underframe, and the end of the adapting tube movably inserts into the locking sleeve. There is a locking piece designed on the locking sleeve, which allows the locking sleeve to clamp the adapting tube and secure the adapting tube onto the locking sleeve. The present multi-functional garden implement can replace the working head quickly, so that it has functions of cutting, micro tilling, etc.

17 Claims, 6 Drawing Sheets

(51) Int. Cl.
  *A01B 51/00* (2006.01)
  *A01D 34/84* (2006.01)
  *A01D 42/00* (2006.01)
  *A01B 33/02* (2006.01)
  *A01D 101/00* (2006.01)

(52) U.S. Cl.
  CPC ............. *A01D 34/84* (2013.01); *A01D 42/00* (2013.01); *A01D 2101/00* (2013.01)

(56) References Cited

U.S. PATENT DOCUMENTS

| | | | | |
|---|---|---|---|---|
| 3,803,819 | A * | 4/1974 | Ehrlich | A01D 34/84 56/17.1 |
| 4,122,601 | A * | 10/1978 | Katsuya | A01D 34/90 172/41 |
| 4,157,019 | A * | 6/1979 | Von Allworden | A01B 71/08 403/314 |
| 4,185,936 | A * | 1/1980 | Takahashi | F16B 7/1454 16/DIG. 39 |
| 4,257,213 | A | 3/1981 | Brumat | |
| 4,575,356 | A * | 3/1986 | Murohushi | F16C 1/08 464/52 |
| 4,643,460 | A * | 2/1987 | Lieberg | F16L 17/04 24/271 |
| 4,733,471 | A * | 3/1988 | Rahe | A01D 34/90 30/276 |
| 4,840,020 | A | 6/1989 | Oka | |
| 4,869,056 | A | 9/1989 | Lynch | |
| 4,873,818 | A | 10/1989 | Turner | |
| 4,936,886 | A * | 6/1990 | Quillen | A01D 34/4167 172/14 |
| 4,949,534 | A | 8/1990 | Evans | |
| 4,989,323 | A * | 2/1991 | Casper | A01D 34/902 30/276 |
| 4,991,298 | A * | 2/1991 | Matre | A01G 3/08 30/166.3 |
| 5,423,565 | A | 6/1995 | Smith | |
| 5,577,374 | A | 11/1996 | Huston | |
| 5,603,173 | A * | 2/1997 | Brazell | E01H 5/04 37/244 |
| 5,664,904 | A * | 9/1997 | Hapgood | F16B 7/0433 248/230.4 |
| 5,829,236 | A * | 11/1998 | Ballard | A01D 34/001 172/13 |
| 6,006,434 | A * | 12/1999 | Templeton | A01D 34/90 30/276 |
| 6,345,489 | B1 * | 2/2002 | Everts | A01B 51/02 172/245 |
| 6,874,306 | B2 * | 4/2005 | Hishida | A01D 34/001 56/12.7 |
| 6,959,528 | B1 | 11/2005 | Scordilis | |
| 6,972,042 | B2 * | 12/2005 | Benson | A61F 2/76 403/314 |
| 6,997,633 | B2 * | 2/2006 | Thomas | A01D 34/90 172/438 |
| 7,040,832 | B2 * | 5/2006 | Hsieh | F16B 7/105 248/125.8 |
| 7,219,488 | B2 * | 5/2007 | Hatfield | A01D 34/001 56/12.7 |
| 7,241,084 | B2 * | 7/2007 | Hutton | F16L 23/10 403/338 |
| 7,382,104 | B2 * | 6/2008 | Jacobson | A01D 34/902 15/330 |
| 7,975,459 | B1 | 7/2011 | Murawski | |
| 8,006,711 | B2 * | 8/2011 | Pietrzak | A45B 9/00 135/65 |
| 8,046,980 | B1 * | 11/2011 | Schroeck | A01D 43/16 56/12.7 |
| 8,117,756 | B2 * | 2/2012 | Nakaya | A01D 34/902 30/276 |
| 8,608,118 | B2 * | 12/2013 | Lai | F16B 7/1454 248/74.1 |
| 9,333,636 | B2 * | 5/2016 | Yamada | A01D 34/90 |
| 2005/0000202 | A1 | 1/2005 | Scordilis | |
| 2006/0016632 | A1 | 1/2006 | Samejima et al. | |
| 2008/0216459 | A1 | 9/2008 | Spitsley | |
| 2010/0223897 | A1 | 9/2010 | Mills | |
| 2012/0066912 | A1 * | 3/2012 | Ferrell | A01D 34/4166 30/276 |
| 2013/0075122 | A1 * | 3/2013 | Yamada | A01D 34/90 173/213 |
| 2013/0142563 | A1 * | 6/2013 | Sumi | F16B 7/1418 403/109.1 |
| 2013/0152537 | A1 * | 6/2013 | Cathcart | A01D 34/824 56/12.7 |
| 2014/0026530 | A1 * | 1/2014 | Cathcart | A01D 34/416 56/12.7 |
| 2014/0208598 | A1 * | 7/2014 | Morita | A01G 3/053 30/276 |
| 2014/0208599 | A1 * | 7/2014 | Nagahama | A01D 34/6806 30/277.4 |
| 2014/0338299 | A1 | 11/2014 | Lowery | |
| 2015/0201556 | A1 | 7/2015 | Ito et al. | |
| 2015/0223398 | A1 | 8/2015 | Nelson | |
| 2016/0258489 | A1 * | 9/2016 | Yao | F16B 7/0426 |

* cited by examiner

MULTI-FUNCTIONAL GARDEN IMPLEMENT

RELATED APPLICATIONS

This application claims benefit to Chinese Patent Application No. CN201620114499.3, filed Feb. 4, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the technical field of garden implements, particularly to a multi-functional garden implement.

Related Art

With the development of the construction in domestic cities, the greening in the city has become a big industry. The ordinary maintenance relies on garden implements. The garden implements commonly seen in everyday life, such as the lawn mower, the pruning shears, the string trimmer, the lawn edger, the bush cutting machine, and the micro tiller, are most powered by gasoline engines.

One prior art lawn mower comprises a handle connecting seat. A bracket is secured to the handle connecting seat, and wheels are connected to the lower end of the bracket. The handle is connected to the rear end of the handle connecting seat through the handle sleeve, and a handle switch is installed on the rear end of the handle. A gasoline engine is fixed above the bracket, and the gasoline engine connects with the trimming head which is in front of the bracket, through the transmitting rod on the transmitting connecting seat. The working head of this lawn mower is connected to a gasoline engine through a transmitting shaft, but the transmitting shaft is difficult to be disassembled from the gasoline engine. Therefore, the lawn mower only has the mowing function and is difficult to replace working head with other functions. The applicability is poor.

SUMMARY OF THE INVENTION

One objective of a preferred embodiment of the invention is to avoid the issues stated above in the prior art, and to provide a multi-functional garden implement. The present multi-functional garden implement can replace the working head quickly, so that it has functions of cutting, micro tilling, etc.

One objective of a preferred embodiment of the invention can be achieved by the following technical proposal:

A multi-functional garden implement comprises an underframe. A power motor is secured to the underframe, and the output shaft of the power motor faces the front end of the underframe. It is characterized in that:

The multi-functional garden implement also comprises an adapting tube; inside the adapting tube a transmitting shaft is rotatably connected. One end of the transmitting shaft connects to a working head. A locking sleeve is secured to the underframe, and the end of the adapting tube movably inserts into the locking sleeve. There is a locking piece designed on the locking sleeve, which allows the locking sleeve to clamp the adapting tube and secure the adapting tube onto the locking sleeve. When the adapting tube is secured onto the locking sleeve, the other end of the transmitting shaft transmission-connects to the output shaft of the power motor.

Two wheels are connected with the underframe as a support, and a pushing handle is connected to the rear end of the underframe to push the implement to go forward or backward. The power motor is installed on the underframe, and the working head is connected to the power motor and faces the front end of the underframe. The working head could be a mowing cutter, an edging cutter or a micro tilling cutter. All of those working heads are connected to an adapting tube and a transmitting shaft, and the locking sleeve is secured to the front end of the power motor. Appropriate working heads may be chosen according to the requirements for the gardening work, and then the adapting tube of the working head can insert into the locking sleeve and keep in place. At this point, the transmitting shaft fits the output shaft of the power motor by splines. The locking piece allows the locking sleeve to clamp and secure the adapting tube tightly, so as to achieve a quick installation of the working head. Therefore, the present multi-functional garden implement possesses the capability of quickly replacing the working head like mowing cutter, edging cutter or micro tilling cutter, achieves an implement with multiple functions, and the applicability is better.

In the multi-functional garden implement, a long stripped opening pass is designed on the outer wall of the locking sleeve in the axial direction. Both ends of the opening pass pass through the two end faces of the locking sleeve respectively; and on the outer wall of the locking sleeve, at each of the two sides of the opening pass, there is a connection part. the locking piece is designed on the two connection parts. The locking sleeve is made of metal. After the opening pass is machined, the locking sleeve can have a tiny diametral shrinkage, so it can clamp the adapting tube tightly under the action of the locking piece.

In the multi-functional garden implement, the locking piece comprises a clamping handle and a pull pin. One end of the pull pin is fixed to one connection part, and a through hole is designed on the other connection part. The other end of the pull pin consecutively passes through the opening pass and the through hole, and there is a connection column vertically on the end of the pull pin stretching out of the through hole. the clamping handle has a clamping head, and the outer side face of the clamping head is a curved clamping surface. The clamping head has a connecting hole designed on it, and rotatably fits the connection column through the connecting hole. The clamping surface presses against the outer side face of the connection part, and distance between the axis line of the connecting hole and the clamping surface gradually gets bigger in the circumferential direction of the connecting hole. The clamping head always presses against the connection part. When the part on the clamping surface, where its separation from the axis line of the connecting hole is smaller, presses against the connection part, the locking sleeve is loose, and it is convenient to insert or extract the adapting tube. By pressing the clamping handle, with the distance between the clamping surface and the axis line of the connecting hole getting bigger, the clamping head gradually presses against the connection parts, and the two connection parts get closer. When the part on the clamping surface, where its separation from the axis line of the connecting hole is bigger, presses against the connection part, the locking sleeve can clamp the adapting tube tightly. What is needed to do during this process is only to press the clamping handle, so the operation is fast and convenient.

In the multi-functional garden implement, a locating piece is also designed inside the opening pass. The locating piece rotatably connects to the two opposite side walls of the opening pass. On one end of the edge of the locating piece facing the axis line of the locking sleeve, there is a locating boss, and a locating slot is designed on the outer peripheral wall of the adapting tube. A locating spring is designed between the locating piece and the locking sleeve. When the adapting tube inserts into the locking sleeve, the locating spring can make the locating boss insert into the locating slot. After the adapting tube inserts into the locking sleeve and gets in place, the locating spring acts on the locating piece, and the locating boss can be pressed inside the locating slot. This achieves a pre-positioning of the adapting tube before the locking sleeve clamps it, and also achieves an auxiliary positioning after the locking sleeve clamps it, so as to improve the stability of the connection between the adapting tube and the locking sleeve.

In the multi-functional garden implement, a connection bushing is fixed inside the opening pass in the widthwise direction, and the locating piece rotatably connects to the connection bushing. the pull pin passes through the connection bushing. On the edge of the locating piece, there is a confining boss as well. The confining boss and the locating boss are located in the two sides of the connection bushing respectively. One end of the locating spring is sleeved over the confining boss, and the other end presses against the locking sleeve. The connection bushing separates the locating piece from the pull pin, and avoids the interference between the two parts. By the law of the lever, the locating spring pushes the locating piece so that the locating boss is pressed inside the locating slot. When it is required to disassemble the adapting tube, the only thing necessary to do is to press the end of the locating piece which is connected to the locating spring. The operation is fast and convenient.

In the multi-functional garden implement, a long stripped recess is designed on each of the two opposite sides of the opening pass. The lengthwise direction of the two recesses is the same as the diametral direction of the locking sleeve, and the two recesses are opposite each other. The locating spring is installed inside the recesses and at least one end of the locating spring presses against the inner end faces of the recesses. The two recesses form a hole-shaped cavity, which is used to hold the locating spring. This achieves a more compact and more stable structure.

In the multi-functional garden implement, a cover plate is also fixed to the locking sleeve. One edge of the cover plate is bended toward one side to form a hinge part, and the opposite edge of the cover plate is bended toward the same side to form a locating part. The hinge part is hinged to one side face of one connection part through a bolt, and the cover plate is located above the two connection parts. An arc-shaped guide slot is designed on the locating part. The guide slot and the bolt have the same axis line, and the pull pin movably passes through the guide slot. The clamping surface of the clamping handle presses against one side face of the locating part, and the other side face of the locating part presses against the side face of the other connection part. When the cover plate leans against the upper end faces of the two connection parts, the side face of the cover plate can press against the locating piece tightly and drives the locating boss to insert into the locating slot. The cover plate is hinged to the connection part through the hinge part, and achieves the guiding and positioning during the swing motion through the locating part. Namely, after the locating boss on the locating piece is pressed inside the locating slot, the cover plate can be flipped over to cover the connection parts. At this point, the cover plate can press against the end of the locating piece where the locating boss is located, so the locating piece locates the adapting tube more stably. The cover plate can also cover the clearance at the opening pass, prevents foreign matters from entering, and improves the stability.

In the multi-functional garden implement, a reset torsion spring is sleeved over the bolt as well. One end of the reset torsion spring presses against the cover plate, and the other end presses against the connection part. Under the action of the reset torsion spring, the cover plate tends to depart from the connection part. When pressing the clamping handle to release the pull pin, the cover plate can be automatically opened under the action of the reset torsion spring. The operation is convenient.

In the multi-functional garden implement, on the edge of the locating piece away from the axis line of the locking sleeve, there is a pressing boss. The pressing boss and the locating boss are located in the same side of the connection bushing. When the side face of the cover plate leans against the upper end faces of the connection parts, the side face of the cover plate presses against the pressing boss. Namely, when the cover plate is closed, the side face of the cover plate presses against the pressing boss, which ensures that the locating boss is located inside the locating slot stably.

In the multi-functional garden implement, a ring-shaped locking block is sleeved over the pull pin. The locking block is located between the clamping handle and the locating part on the cover plate. The clamping surface of the clamping handle presses against one end face of the locking block, and the other end face of the locking block presses against the side face of the locating part on the cover plate. Because the clamping head needs to rotate during the operation, the clamping head is designed to engage with the locking block. This avoids the direct wear on the connection part by the clamping head. Of course, by changing a locking block with a different thickness, the pulling force of the pull pin is changed as well. Namely, the locking force of the locking sleeve onto the adapting tube is adjusted.

Compared to the prior art, the present multi-functional garden implement has the following advantages:

1. Appropriate working heads may be chosen according to the requirements for the gardening work, and then the adapting tube of the working head can insert into the locking sleeve and keep in place. The locking piece allows the locking sleeve to clamp and secure the adapting tube tightly, so as to achieve a quick installation of the working head. Therefore, the present multi-functional garden implement possesses the capability of quickly replacing the working head like mowing cutter, edging cutter or micro tilling cutter, achieves an implement with multiple functions, and the applicability is better.

2. The locating boss can be pressed inside the locating slot. This achieves a pre-positioning of the adapting tube before the locking sleeve clamps it, and also achieves an auxiliary positioning after the locking sleeve clamps it, so as to improve the stability of the connection between the adapting tube and the locking sleeve.

3. The cover plate can press against the end of the locating piece where the locating boss is located, so the locating piece locates the adapting tube more stably. The cover plate can also cover the clearance at the opening pass, prevents foreign matters from entering, and improves the stability.

DETAILED DESCRIPTION OF THE INVENTION

Preferred embodiments of the invention will be described below and the technical proposals of the invention will be further illustrated in connection with the accompanying figures. However, the present invention shall not be limited to these embodiments.

As shown in FIG. 1, FIG. 2, FIG. 3, and FIG. 4, a multi-functional garden implement comprises an underframe (1). Two wheels are connected with the underframe (1) as a support, and a pushing handle is connected to the rear end of the underframe (1) to push the implement to go forward or backward. A power motor (11) is secured to the underframe (1), and the output shaft of the power motor (11) faces the front end of the underframe (1). The multi-functional garden implement also comprises an adapting tube (2); inside the adapting tube (2) a transmitting shaft (21) is rotatably connected. One end of the transmitting shaft (21) connects to a working head (22). The working head (22) could be a mowing cutter, an edging cutter or a micro tilling cutter. All of those working heads (22) are connected to an adapting tube (2) and a transmitting shaft (21). A locking sleeve (3) is secured to the underframe (1), and the end of the adapting tube (2) movably inserts into the locking sleeve (3). There is a locking piece (4) designed on the locking sleeve (3), which allows the locking sleeve (3) to clamp the adapting tube (2) and secure the adapting tube (2) onto the locking sleeve (3). When the adapting tube (2) is secured onto the locking sleeve (3), the other end of the transmitting shaft (21) transmission-connects to the output shaft of the power motor (11). Appropriate working heads (22) may be chosen according to the requirements for the gardening work, and then the adapting tube (2) of the working head (22) can insert into the locking sleeve (3) and keep in place. At this point, the transmitting shaft (21) fits the output shaft of the power motor (11) by splines. The locking piece (4) allows the locking sleeve (3) to clamp and secure the adapting tube (2) tightly, so as to achieve a quick installation of the working head (22). Therefore, the present multi-functional garden implement possesses the capability of quickly replacing the working head (22) like mowing cutter, edging cutter or micro tilling cutter, achieves an implement with multiple functions, and the applicability is better.

Figure 1:
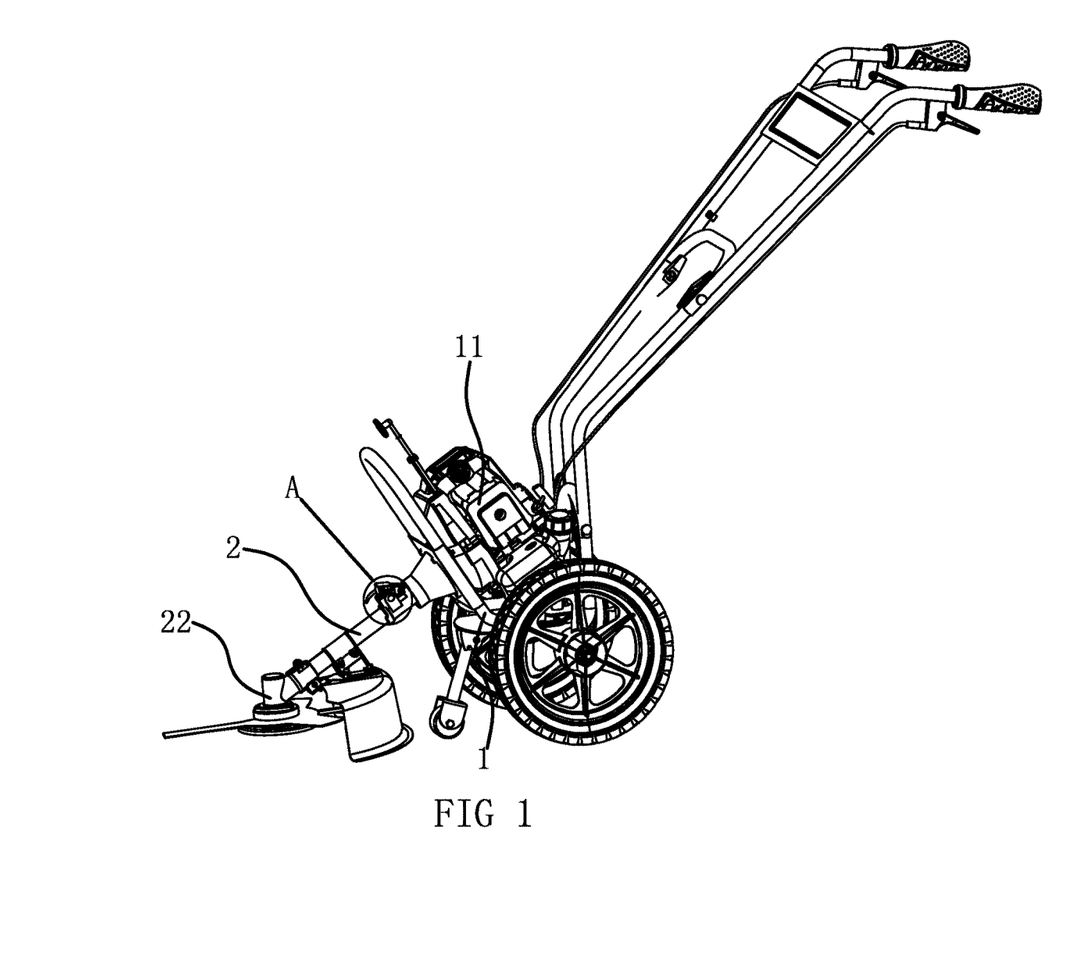
FIG. 1 is a perspective view of one preferred embodiment of the multi-functional garden implement.
Figure 2:
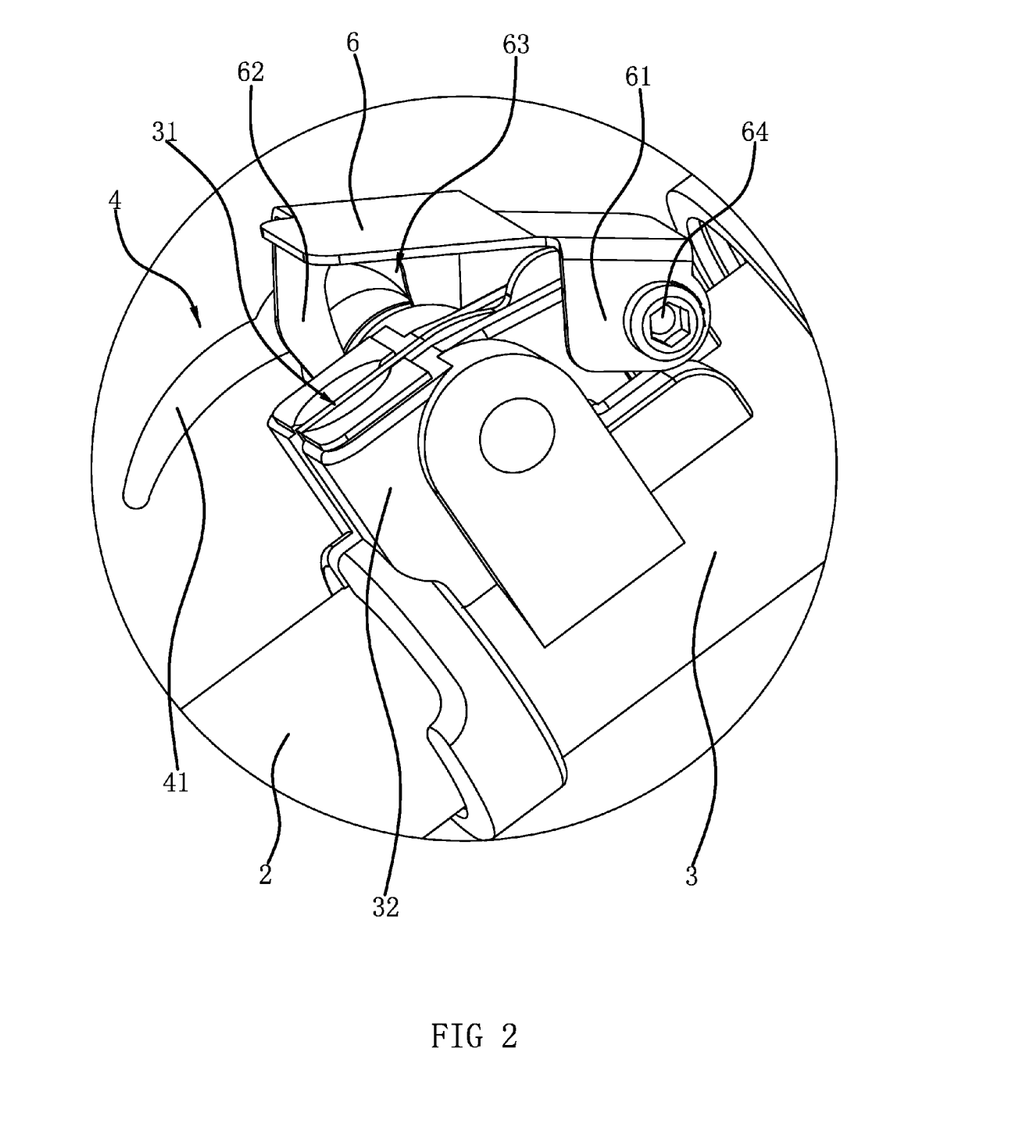
FIG. 2 is a detailed view of Section A in FIG. 1.
Figure 3:
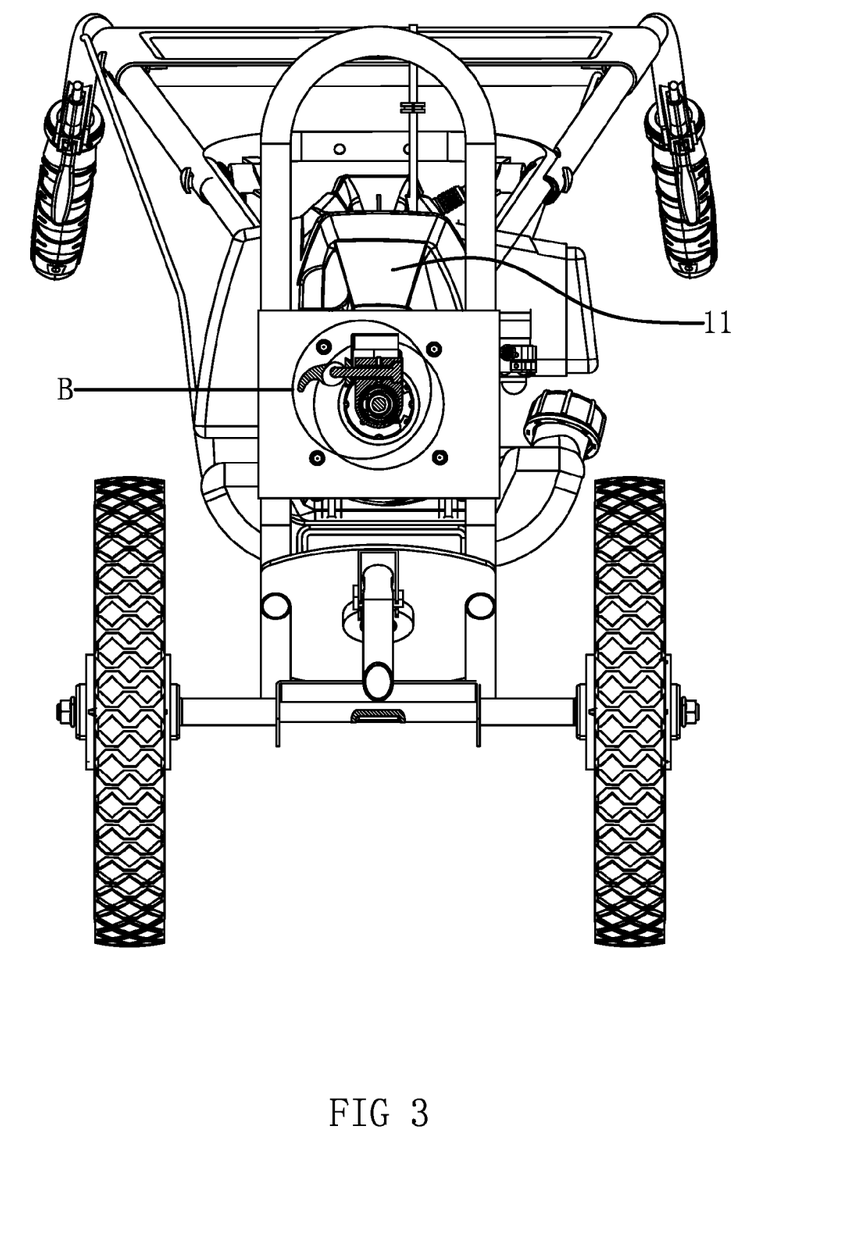
FIG. 3 is a sectional view of one preferred embodiment of the multi-functional garden implement.
Figure 4:
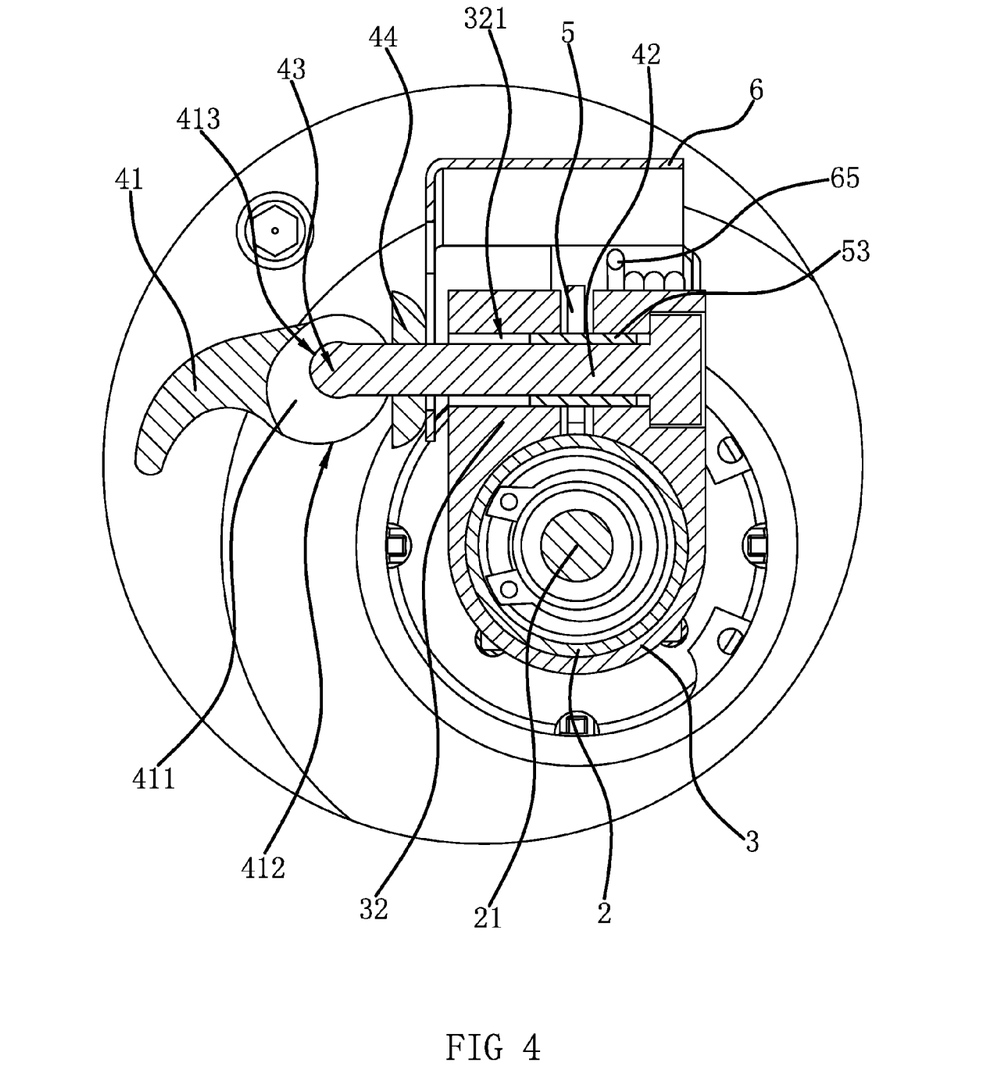
FIG. 4 is a detailed view of Section B in FIG. 3.

Specifically, as shown in FIG. 4, a long stripped opening pass (31) is designed on the outer wall of the locking sleeve (3) in the axial direction. Both ends of the opening pass (31) pass through to the two end faces of the locking sleeve (3) respectively; and on the outer wall of the locking sleeve (3), at each of the two sides of the opening pass (31), there is a connection part (32). The locking piece (4) is designed on the two connection parts (32). The locking sleeve (3) is made of metal. After the opening pass (31) is machined, the locking sleeve (3) can have a tiny diametral shrinkage, so it can clamp the adapting tube (2) tightly under the action of the locking piece (4). The locking piece (4) comprises a clamping handle (41) and a pull pin (42). One end of the pull pin (42) is fixed to one connection part (32), and a through hole (321) is designed on the other connection part (32).

The other end of the pull pin (42) consecutively passes through the opening pass (31) and the through hole (321), and there is a connection column (43) vertically on the end of the pull pin (42) stretching out of the through hole (321). The clamping handle (41) has a clamping head (411), and the outer side face of the clamping head (411) is a curved clamping surface (412). The clamping head (411) has a connecting hole (413) designed on it, and rotatably fits the connection column (43) through the connecting hole (413). The clamping surface (412) presses against the outer side face of the connection part (32), and distance between the axis line of the connecting hole (413) and the clamping surface (412) gradually gets bigger in the circumferential direction of the connecting hole (413). The clamping head (411) always presses against the connection part (32). When the part on the clamping surface (412), where its separation from the axis line of the connecting hole (413) is smaller, presses against the connection part (32), the locking sleeve (3) is loose, and it is convenient to insert or extract the adapting tube (2). By pressing the clamping handle (41), with the distance between the clamping surface (412) and the axis line of the connecting hole (413) getting bigger, the clamping head (411) gradually presses against the connection parts (32), and the two connection parts (32) get closer. When the part on the clamping surface (412), where its separation from the axis line of the connecting hole (413) is bigger, presses against the connection part (32), the locking sleeve (3) can clamp the adapting tube (2) tightly. What is needed to do during this process is only to press the clamping handle (41), so the operation is fast and convenient.

Figure 5:
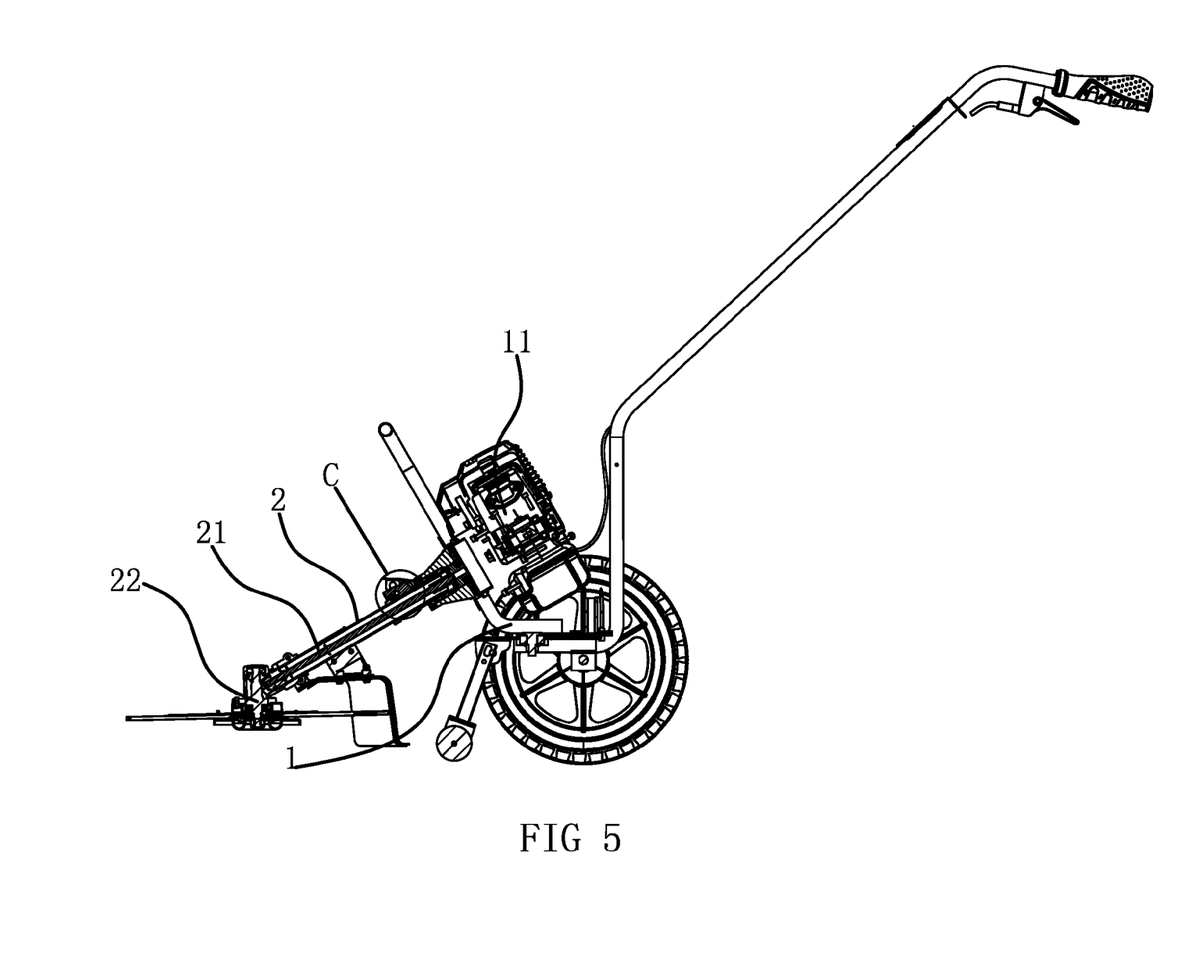
FIG. 5 is a sectional view of one preferred embodiment of the multi-functional garden implement from another angle of view.
Figure 6:
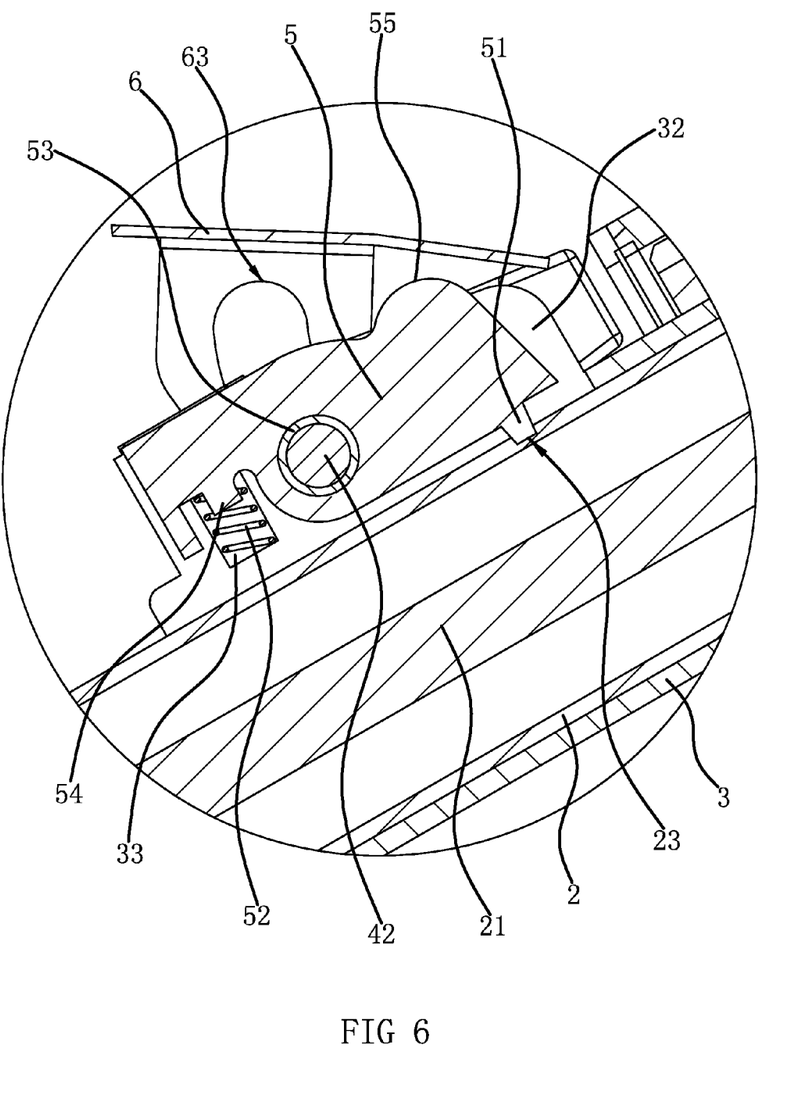
FIG. 6 is a detailed view of Section C in FIG. 5.

As shown in FIG. 5 and FIG. 6, a locating piece (5) is also designed inside the opening pass (31). The locating piece (5) rotatably connects to the two opposite side walls of the opening pass (31). On one end of the edge of the locating piece (5) facing the axis line of the locking sleeve (3), there is a locating boss (51), and a locating slot (23) is designed on the outer peripheral wall of the adapting tube (2). A locating spring (52) is designed between the locating piece (5) and the locking sleeve (3). When the adapting tube (2) inserts into the locking sleeve (3), the locating spring (52) can make the locating boss (51) insert into the locating slot (23). After the adapting tube (2) inserts into the locking sleeve (3) and gets in place, the locating spring (52) acts on the locating piece (5), and the locating boss (51) can be pressed inside the locating slot (23). This achieves a pre-positioning of the adapting tube (2) before the locking sleeve (3) clamps it, and also achieves an auxiliary positioning after the locking sleeve (3) clamps it, so as to improve the stability of the connection between the adapting tube (2) and the locking sleeve (3). A connection bushing (53) is fixed inside the opening pass (31) in the widthwise direction, and the locating piece (5) rotatably connects to the connection bushing (53). The pull pin (42) passes through the connection bushing (53). On the edge of the locating piece (5), there is a confining boss (54) as well. The confining boss (54) and the locating boss (51) are located in the two sides of the connection bushing (53) respectively. One end of the locating spring (52) is sleeved over the confining boss (54), and the other end presses against the locking sleeve (3). The connection bushing (53) separates the locating piece (5) from the pull pin (42), and avoids the interference between the two parts. By the law of the lever, the locating spring (52) pushes the locating piece (5) so that the locating boss (51) is pressed inside the locating slot (23). When it is required to disassemble the adapting tube (2), the only thing necessary to do is to press the end of the locating piece (5) which is connected to the locating spring (52). The operation is fast and convenient. A long stripped recess (33) is designed on each of the two opposite sides of the opening pass (31). The lengthwise direction of the two recesses (33) is the same as the diametral direction of the locking sleeve (3), and the two recesses (33) are opposite each other. The locating spring (52) is installed inside the recesses (33) and at least one end of the locating spring (52) presses against the inner end faces of the recesses (33). The two recesses (33) form a hole-shaped cavity, which is used to hold the locating spring (52). This achieves a more compact and more stable structure.

A cover plate (6) is also fixed to the locking sleeve (3). One edge of the cover plate (6) is bended toward one side to form a hinge part (61), and the opposite edge of the cover plate (6) is bended toward the same side to form a locating part (62). The hinge part (61) is hinged to one side face of one connection part (32) through a bolt (64), and the cover plate (6) is located above the two connection parts (32). An arc-shaped guide slot (63) is designed on the locating part (62). The guide slot (63) and the bolt (64) have the same axis line, and the pull pin (42) movably passes through the guide slot (63). The clamping surface (412) of the clamping handle (41) presses against one side face of the locating part (62), and the other side face of the locating part (62) presses against the side face of the other connection part (32). When the cover plate (6) leans against the upper end faces of the two connection parts (32), the side face of the cover plate (6) can press against the locating piece (5) tightly and drives the locating boss (51) to insert into the locating slot (23). The cover plate (6) is hinged to the connection part (32) through the hinge part (61), and achieves the guiding and positioning during the swing motion through the locating part (62). Namely, after the locating boss (51) on the locating piece (5) is pressed inside the locating slot (23), the cover plate (6) can be flipped over to cover the connection parts (32). At this point, the cover plate (6) can press against the end of the locating piece (5) where the locating boss (51) is located, so the locating piece (5) locates the adapting tube (2) more stably. The cover plate (6) can also cover the clearance at the opening pass (31), prevents foreign matters from entering, and improves the stability. A reset torsion spring (65) is sleeved over the bolt (64) as well. One end of the reset torsion spring (65) presses against the cover plate (6), and the other end presses against the connection part (32). Under the action of the reset torsion spring (65), the cover plate (6) tends to depart from the connection part (32). When pressing the clamping handle (41) to release the pull pin (42), the cover plate (6) can be automatically opened under the action of the reset torsion spring (65). The operation is convenient. On the edge of the locating piece (5) away from the axis line of the locking sleeve (3), there is a pressing boss (55). The pressing boss (55) and the locating boss (51) are located in the same side of the connection bushing (53). When the side face of the cover plate (6) leans against the upper end faces of the connection parts (32), the side face of the cover plate (6) presses against the pressing boss (55). Namely, when the cover plate (6) is closed, the side face of the cover plate (6) presses against the pressing boss (55), which ensures that the locating boss (51) is located inside the locating slot (23) stably. A ring-shaped locking block (44) is sleeved over the pull pin (42). The locking block (44) is located between the clamping handle (41) and the locating part (62) on the cover plate (6). The clamping surface (412) of the clamping handle (41) presses against one end face of the locking block (44), and the other end face of the locking block (44) presses against the side face of the locating part (62) on the cover plate (6). Because the clamping head (411) needs to rotate during the operation, the clamping head (411) is designed to engage with the locking block (44). This avoids the direct wear on the connection part (32) by the clamping head (411). Of course, by changing a locking block (44) with a different thickness, the pulling force of the pull pin (42) is changed as well. Namely, the locking force of the locking sleeve (3) onto the adapting tube (2) is adjusted.

The description of the preferred embodiments thereof serves only as an illustration of the spirit of the invention. It will be understood by those skilled in the art that various changes or supplements in form and details may be made therein without departing from the spirit and scope of the invention as defined by the appended claims.

Although the terms of Underframe (1), Power Motor (11), Adapting Tube (2), etc. are often used herein, it does not exclude the possibility to use any other terms. Using such terms is only to describe or explain the nature of the present invention more conveniently. Any additional restrictions are contrary to the spirit of the present invention.

LIST OF REFERENCE NUMERALS

1 Underframe
11 Power Motor
2 Adapting Tube
21 Transmitting Shaft
22 Working Head
23 Locating Slot
3 Locking Sleeve
31 Opening Pass
32 Connection Part
321 Through Hole
33 Recess
4 Locking Piece
41 Clamping Handle
411 Clamping Head
412 Clamping Surface
413 Connecting Hole
42 Pull Pin
43 Connection Column
44 Locking Block
5 Locating Piece
51 Locating Boss
52 Locating Spring
53 Connection Bushing
54 Confining Boss
55 Pressing Boss
6 Cover Plate
61 Hinge Part
62 Locating Part
63 Guide Slot
64 Bolt
65 Reset Torsion Spring

What is claimed is:
1. A multi-functional garden implement comprising:
an underframe (1);

a power motor (11) secured to the underframe (1), the power motor (11) having an output shaft facing a front end of the underframe (1);

an adapting tube (2);

a transmitting shaft (21) rotatably connected inside the adapting tube (2);

a working head (22) connected to a first end of the transmitting shaft (21);

a locating slot (23) on an outer peripheral wall of the adapting tube (2);

a locking sleeve (3) secured to the underframe (1), one end of the adapting tube (2) movably inserted into the locking sleeve (3);

a long stripped opening pass (31) is designed on an outer wall of the locking sleeve (3) in an axial direction; and a locating piece (5) inside the opening pass (31), the locating piece (5) rotatably connects to two opposite side walls of the opening pass (31);

a locating boss (51) on a first end of an edge of the locating piece (5);

a locating spring (52) between a second end of the locating piece (5) and the locking sleeve (3); and a locking piece (4) designed on the locking sleeve (3), the locking piece (4) capable of allowing the locking sleeve (3) to clamp the adapting tube (2) and secure the adapting tube (2) onto the locking sleeve (3);

wherein when the adapting tube (2) inserts into the locking sleeve (3), the locating spring (52) is capable of causing the locating boss (51) to insert into the locating slot (23), and when the adapting tube (2) is secured onto the locking sleeve (3), a second end of the transmitting shaft (21) transmission-connects to the output shaft of the power motor (11).

2. The multi-functional garden implement as claimed in claim 1 wherein a long stripped opening pass (31) completely through a side of the locking sleeve (3) is designed on an outer wall of the locking sleeve (3) in an axial direction;

wherein on the outer wall of the locking sleeve (3), at each of two sides of the opening pass (31), there is a first connection part (32) and a second connection part (32) respectively; and wherein the locking piece (4) is designed on the two connection parts (32).

3. The multi-functional garden implement as claimed in claim 2 wherein the locking piece (4) comprises a clamping handle (41) and a pull pin (42);

wherein a first end of the pull pin (42) is fixed to the first connection part (32), and a through hole (321) is designed on the second connection part (32);

wherein a second end of the pull pin (42) consecutively passes through the opening pass (31) and the through hole (321), and there is a connection column (43) vertically on the end of the pull pin (42) stretching out of the through hole (321);

wherein the clamping handle (41) has a clamping head (411), and an outer side face of the clamping head (411) is a curved clamping surface (412);

wherein the clamping head (411) has a connecting hole (413) designed on it, and rotatably fits the connection column (43) through the connecting hole (413); and wherein the clamping surface (412) presses against an outer side face of the connection part (32), and a distance between an axis line of the connecting hole (413) and the clamping surface (412) gradually gets bigger in a circumferential direction of the connecting hole (413).

4. The multi-functional garden implement as claimed in claim 3 wherein a connection bushing (53) is fixed inside the opening pass (31) in a widthwise direction, and the locating piece (5) rotatably connects to the connection bushing (53);

wherein the pull pin (42) passes through the connection bushing (53);

wherein on an edge of the locating piece (5), there is a confining boss (54);

wherein the confining boss (54) and the locating boss (51) are located in two sides of the connection bushing (53) respectively; and wherein a first end of the locating spring (52) is sleeved over the confining boss (54), and a second end of the locating spring (52) presses against the locking sleeve (3).

5. The multi-functional garden implement as claimed in claim 4 wherein a long stripped recess (33) is designed on each of two opposite sides of the opening pass (31);

wherein a lengthwise direction of the two recesses (33) is the same as a diametral direction of the locking sleeve (3), and the two recesses (33) are opposite each other; and wherein the locating spring (52) is installed inside the recesses (33) and at least one end of the locating spring (52) presses against inner end faces of the recesses (33).

6. The multi-functional garden implement as claimed in claim 3 wherein a cover plate (6) is fixed to the locking sleeve (3);

wherein a first edge of the cover plate (6) is bended toward one side to form a hinge part (61), and a second opposite edge of the cover plate (6) is bended toward the same side to form a locating part (62);

wherein the hinge part (61) is hinged to one side face of one connection part (32) through a bolt (64), and the cover plate (6) is located above the two connection parts (32);

wherein an arc-shaped guide slot (63) is designed on the locating part (62);

wherein the guide slot (63) and the bolt (64) have the same axis line, and the pull pin (42) movably passes through the guide slot (63);

wherein the clamping surface (412) of the clamping handle (41) presses against one side face of the locating part (62), and the other side face of the locating part (62) presses against the side face of the other connection part (32); and wherein when a side face of the cover plate (6) leans against upper end faces of the two connection parts (32), a side of cover plate (6) is capable of pressing against the locating piece (5) tightly and drives the locating boss (51) to insert into the locating slot (23).

7. The multi-functional garden implement as claimed in claim 6 wherein a reset torsion spring (65) is sleeved over the bolt (64);

wherein a first end of the reset torsion spring (65) presses against the cover plate (6) and a second end of the reset torsion spring (65) presses against the connection part (32); and wherein under an action of the reset torsion spring (65), the cover plate (6) tends to depart from the connection part (32).

8. The multi-functional garden implement as claimed in claim 6 wherein on an edge of the locating piece (5) away from an axis line of the locking sleeve (3), there is a pressing boss (55);

wherein the pressing boss (55) and the locating boss (51) are located in a same side of the connection bushing (53); and wherein when a side face of the cover plate (6) leans against upper end faces of the connection parts (32), the side face of the cover plate (6) presses against the pressing boss (55).

9. The multi-functional garden implement as claimed in claim 6 wherein a ring-shaped locking block (44) is sleeved over the pull pin (42);

wherein the locking block (44) is located between the clamping handle (41) and the locating part (62) on the cover plate (6); and wherein the clamping surface (412) of the clamping handle (41) presses against a first end face of the locking block (44), and a second end face of the locking block (44) presses against a side face of the locating part (62) on the cover plate (6).

10. The multi-functional garden implement as claimed in claim 4 wherein a cover plate (6) is fixed to the locking sleeve (3);

wherein a first edge of the cover plate (6) is bended toward one side to form a hinge part (61), and a second opposite edge of the cover plate (6) is bended toward the same side to form a locating part (62);

wherein the hinge part (61) is hinged to one side face of one connection part (32) through a bolt (64), and the cover plate (6) is located above the two connection parts (32);

wherein an arc-shaped guide slot (63) is designed on the locating part (62);

wherein the guide slot (63) and the bolt (64) have the same axis line, and the pull pin (42) movably passes through the guide slot (63);

wherein the clamping surface (412) of the clamping handle (41) presses against one side face of the locating part (62), and the other side face of the locating part (62) presses against the side face of the other connection part (32); and wherein when a side face of the cover plate (6) leans against upper end faces of the two connection parts (32), a side of cover plate (6) is capable of pressing against the locating piece (5) tightly and drives the locating boss (51) to insert into the locating slot (23).

11. The multi-functional garden implement as claimed in claim 10 wherein a reset torsion spring (65) is sleeved over the bolt (64);

wherein a first end of the reset torsion spring (65) presses against the cover plate (6) and a second end of the reset torsion spring (65) presses against the connection part (32); and wherein under an action of the reset torsion spring (65), the cover plate (6) tends to depart from the connection part (32).

12. The multi-functional garden implement as claimed in claim 10 wherein on an edge of the locating piece (5) away from an axis line of the locking sleeve (3), there is a pressing boss (55);

wherein the pressing boss (55) and the locating boss (51) are located in a same side of the connection bushing (53); and wherein when a side face of the cover plate (6) leans against upper end faces of the connection parts (32), the side face of the cover plate (6) presses against the pressing boss (55).

13. The multi-functional garden implement as claimed in claim 10 wherein a ring-shaped locking block (44) is sleeved over the pull pin (42);

wherein the locking block (44) is located between the clamping handle (41) and the locating part (62) on the cover plate (6); and wherein the clamping surface (412) of the clamping handle (41) presses against a first end face of the locking block (44), and a second end face of the locking block (44) presses against a side face of the locating part (62) on the cover plate (6).

14. The multi-functional garden implement as claimed in claim 5 wherein a cover plate (6) is fixed to the locking sleeve (3);

wherein a first edge of the cover plate (6) is bended toward one side to form a hinge part (61), and a second opposite edge of the cover plate (6) is bended toward the same side to form a locating part (62);

wherein the hinge part (61) is hinged to one side face of one connection part (32) through a bolt (64), and the cover plate (6) is located above the two connection parts (32);

wherein an arc-shaped guide slot (63) is designed on the locating part (62);

wherein the guide slot (63) and the bolt (64) have the same axis line, and the pull pin (42) movably passes through the guide slot (63);

wherein the clamping surface (412) of the clamping handle (41) presses against one side face of the locating part (62), and the other side face of the locating part (62) presses against the side face of the other connection part (32); and wherein when a side face of the cover plate (6) leans against upper end faces of the two connection parts (32), a side of cover plate (6) is capable of pressing against the locating piece (5) tightly and drives the locating boss (51) to insert into the locating slot (23).

15. The multi-functional garden implement as claimed in claim claim 14 wherein a reset torsion spring (65) is sleeved over the bolt (64);

wherein a first end of the reset torsion spring (65) presses against the cover plate (6) and a second end of the reset torsion spring (65) presses against the connection part (32); and wherein under an action of the reset torsion spring (65), the cover plate (6) tends to depart from the connection part (32).

16. The multi-functional garden implement as claimed in claim 14 wherein on an edge of the locating piece (5) away from an axis line of the locking sleeve (3), there is a pressing boss (55);

wherein the pressing boss (55) and the locating boss (51) are located in a same side of the connection bushing (53); and wherein when a side face of the cover plate (6) leans against upper end faces of the connection parts (32), the side face of the cover plate (6) presses against the pressing boss (55).

17. The multi-functional garden implement as claimed in claim 14 wherein a ring-shaped locking block (44) is sleeved over the pull pin (42);

wherein the locking block (44) is located between the clamping handle (41) and the locating part (62) on the cover plate (6); and wherein the clamping surface (412) of the clamping handle (41) presses against a first end face of the locking block (44), and a second end face of the locking block (44) presses against a side face of the locating part (62) on the cover plate (6).

\* \* \* \* \*